United States Patent
Choi et al.

(10) Patent No.: US 10,807,530 B2
(45) Date of Patent: Oct. 20, 2020

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Jaeseob Choi, Suwon-si (KR); Jong Hee Park, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/202,640

(22) Filed: Nov. 28, 2018

(65) Prior Publication Data

US 2020/0114822 A1   Apr. 16, 2020

(30) Foreign Application Priority Data

Oct. 15, 2018   (KR) .................. 10-2018-0122298

(51) Int. Cl.
| | | |
|---|---|---|
| *H04N 5/262* | (2006.01) | |
| *G06K 9/00* | (2006.01) | |
| *G06K 9/62* | (2006.01) | |
| *B60R 1/00* | (2006.01) | |

(52) U.S. Cl.
CPC ............ *B60R 1/00* (2013.01); *G06K 9/00798* (2013.01); *G06K 9/6202* (2013.01); *H04N 5/2628* (2013.01); *B60R 2300/105* (2013.01); *B60R 2300/207* (2013.01); *B60R 2300/60* (2013.01); *B60R 2300/804* (2013.01); *B60R 2300/806* (2013.01)

(58) Field of Classification Search
CPC .... B60R 1/00; G06K 9/00798; G06K 9/6202; H04N 5/2628
USPC .......................................................... 348/118
See application file for complete search history.

(56) References Cited

U.S. PATENT DOCUMENTS

| | | | | |
|---|---|---|---|---|
| 2010/0231717 A1* | 9/2010 | Sasaki | ..................... | G06T 7/80 348/148 |
| 2012/0323449 A1* | 12/2012 | Kim | ..................... | B62D 41/00 701/49 |
| 2015/0116462 A1* | 4/2015 | Makabe | ................. | B60R 1/002 348/47 |
| 2015/0197197 A1* | 7/2015 | Watanabe | ................ | B60R 1/00 348/118 |
| 2016/0014406 A1* | 1/2016 | Takahashi | ................ | G06T 7/73 348/148 |
| 2016/0037032 A1* | 2/2016 | Iwama | ..................... | G06T 7/73 348/148 |
| 2017/0120823 A1* | 5/2017 | Mitsuta | .................... | B60R 1/00 |
| 2017/0243069 A1* | 8/2017 | Shen | ......................... | G06T 7/80 |
| 2017/0297491 A1* | 10/2017 | Tanaka | ..................... | B60R 1/00 |

(Continued)

*Primary Examiner* — Zaihan Jiang
(74) *Attorney, Agent, or Firm* — Brinks Gilson & Lione

(57) ABSTRACT

A vehicle and a control method may determine a state of a vehicle or a slope of a road surface using an image acquired by the vehicle, and provide a top view image with less distortion by correcting the image based on the state of the vehicle and the slope of the road surface. The vehicle includes a display; an image acquiring unit to acquire an image around the vehicle; and a controller to change the image around the vehicle based on a difference between the image around the vehicle and a predetermined reference line and to output the changed image to the display.

8 Claims, 24 Drawing Sheets

(56) References Cited

U.S. PATENT DOCUMENTS

2018/0273052 A1\* 9/2018 Ogura .................... G08G 1/167
2019/0061752 A1\* 2/2019 Wang ................. G06K 9/00805
2019/0126825 A1\* 5/2019 Park ......................... B60R 1/00
2019/0241126 A1\* 8/2019 Murad ...................... B60R 1/12

\* cited by examiner

VEHICLE AND CONTROL METHOD THEREOF

CROSS-REFERENCE TO RELATED APPLICATION

This application claims priority to and the benefit of Korean Patent Application No. 10-2018-0122298, filed on Oct. 15, 2018, which is incorporated herein by reference in its entirety.

FIELD

The present disclosure relates to a vehicle and a control method thereof, capable of providing surrounding images of the vehicle.

BACKGROUND

The statements in this section merely provide background information related to the present disclosure and may not constitute prior art.

An around view refers to a function that displays a top view image taken from a top of a vehicle on a navigation screen by using four cameras which are installed on front and rear portions of the vehicle and lower ends of right and left side mirrors. A driver can grasp the situation around the vehicle at a glance by using a surround view monitoring system so that the driver can safely park the vehicle or can drive the vehicle in a narrow path.

Meanwhile, such an around view, namely a surrounding view, may vary depending on a gradient, air pressure fluctuation of a tire, a number of passengers, and the like in a normal driving environment.

In addition, since an image used to form the surrounding view is obtained by using a wide-angle camera, a linear component in the radial direction on the basis of the camera position may be changed.

In this case, we have discovered that a driver may drive or park the vehicle based on a distorted surrounding view image, and thus the problem of image consistency may lead to the degradation of reliability and safety.

SUMMARY

The present disclosure provides a vehicle and a control method thereof, which determine a state of a vehicle or a slope of a road surface using an image acquired by the vehicle and provide a top view image with less distortion by correcting the image based on the state of the vehicle and the slope of the road surface.

Additional aspects of the disclosure will be set forth in part in the description which follows and, in part, will be obvious from the description, or may be learned by practice of the disclosure.

In one form of the present disclosure, a vehicle includes a display; an image acquiring unit configured to acquire an image around the vehicle; and a controller configured to change the image around the vehicle based on a difference between the image around the vehicle and at least one predetermined reference line and to output the changed image to the display.

The at least one predetermined reference line may include a plurality of predetermined reference lines, and the controller may extract a plurality of feature lines from the image around the vehicle and change the image around the vehicle by comparing the plurality of feature lines with the plurality of predetermined reference lines.

The controller may change the image around the vehicle based on angles defined by the plurality of feature lines and the plurality of predetermined reference lines.

The controller may change the image around the vehicle based on a difference between a first angle defined by the plurality of feature lines and a second angle defined by the plurality of predetermined reference lines.

The controller may decrease a viewing angle for the image around the vehicle based on the angles defined by the feature lines and the predetermined reference lines when the first angle defined by the feature lines is less than the second angle defined by the predetermined reference lines.

The controller may increase a viewing angle for the image around the vehicle based on an angle defined by the feature lines and the predetermined reference lines when the first angle defined by the feature lines is equal to or larger than the second angle defined by the predetermined reference lines.

The controller may compare a feature line of the plurality of feature lines with a predetermined reference line of the plurality of predetermined reference lines to determine a road slope around the vehicle.

The controller may compare the feature lines with the predetermined reference lines to determine a tilt of the vehicle.

The controller may extract the plurality of feature lines based on at least one of a parking line, a driving lane, and a stereoscopic vertical structure included in the image around the vehicle.

In accordance with another aspect of the present disclosure, a method of controlling a vehicle includes: acquiring an image around a vehicle; and changing the image around the vehicle based on a difference between the image around the vehicle and at least one predetermined reference line to output the changed image on a display.

The at least one predetermined reference line may comprise a plurality of predetermined reference lines, and the changing of the image around the vehicle may include extracting a plurality of feature lines from the image around the vehicle; and changing the image around the vehicle by comparing a feature line of the plurality of feature lines with a predetermined reference line of the plurality of predetermined reference lines.

The changing the image around the vehicle may include changing the image around the vehicle based on angles defined by the plurality of feature lines and the plurality of predetermined reference lines.

The changing the image around the vehicle may include changing the image around the vehicle based on a difference between a first angle defined by feature lines of the plurality of feature lines and a second angle defined by predetermined lines of the plurality of predetermined reference lines.

The changing of the image around the vehicle may include reducing a viewing angle for the image around the vehicle based on the angles defined by the feature lines and the predetermined reference lines when the first angle defined by the feature lines is less than the second angle defined by the predetermined reference lines.

The changing of the image around the vehicle may include increasing a viewing angle for the image around the vehicle based on the angles defined by the feature lines and the predetermined reference lines when the first angle defined by the feature lines is equal to or larger than the second angle defined by the predetermined reference lines.

The method may further include comparing a feature line of the plurality of feature lines with a predetermined line of the plurality of predetermined reference lines to determine a road slope around the vehicle.

The method may further include comparing the feature lines with the predetermined reference lines to determine a tilt of the vehicle.

The method may further include extracting the plurality of feature lines based on at least one of a parking line, a driving lane, and a stereoscopic vertical structure included in the image around the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
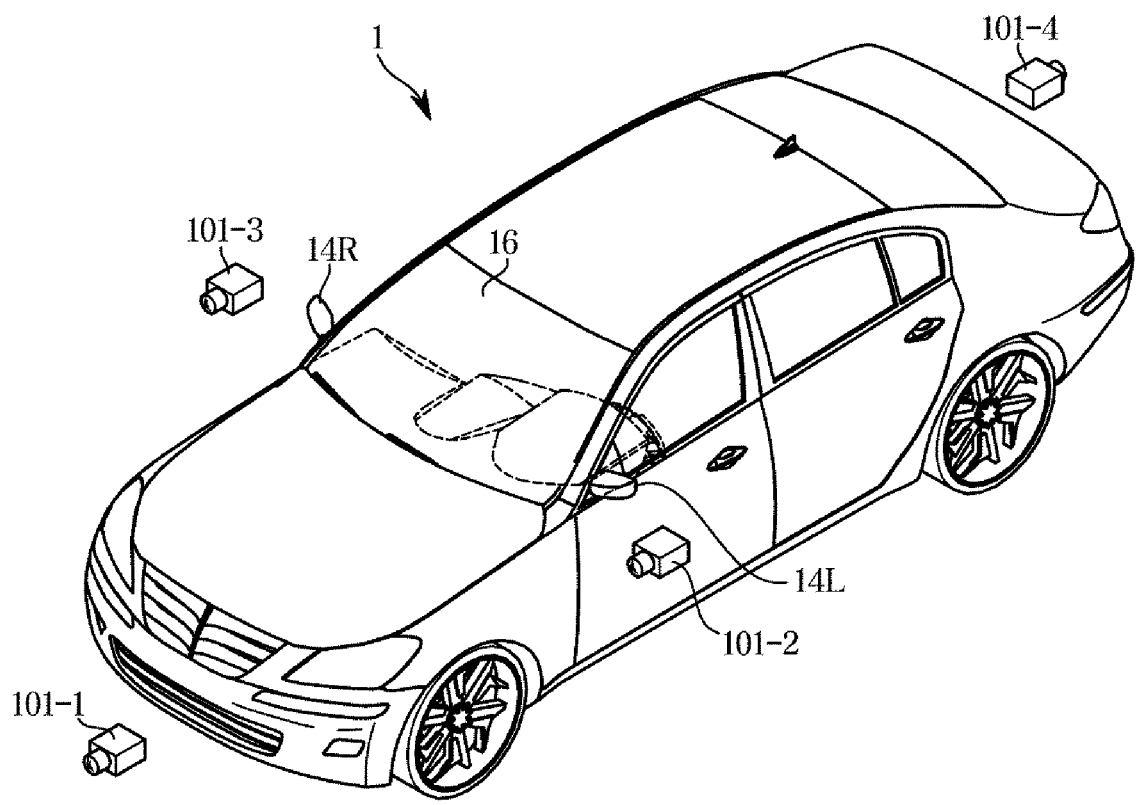
FIG. 1 is a view showing an exterior of a vehicle and an image acquiring unit.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

This present disclosure does not describe all the elements of the forms, and the general contents of the related art or duplicative contents in the forms will be omitted. The terms "unit," "module," "member," and "block" used herein may be implemented by hardware or software. It is also possible that a plurality of units, modules, members, and blocks are implemented as one element, or one unit, module, member, or block includes a plurality of elements in accordance with the forms.

Throughout the present disclosure, when an element is referred to as being "connected" to another element, it may be directly connected or indirectly connected to another element. The indirect connection includes a connection through a wireless communication network.

In addition, when some part "includes" some elements, unless explicitly described to the contrary, it means that other elements may be further included but not excluded.

Throughout the present disclosure, when a member is referred to as being located "on" another member, a third member may be present between the two members in addition to the two members being in contact.

The terms such as "first" or "second" may be used to distinguish one element from another, but the elements are not limited to the terms.

Singular forms are intended to include plural forms unless the context clearly indicates otherwise.

Reference numerals of operations are used for convenience of description, and the reference numerals do not indicate the order of the operations. The operations may be performed in an order that is different from the described order unless a specific order is clearly described in context.

Hereinafter, an operation principle and forms of the present disclosure will be described with reference to the accompanying drawings.

FIG. 1 is a view showing an exterior of a vehicle in one form of the present disclosure.

Referring to FIG. 1, an exterior of a vehicle 1 includes: wheels 12 and 13 configured to move the vehicle 1, doors 15L and 15R configured to shield an inside of the vehicle 1 from an outside, a front glass 16 configured to provide a driver with a view in a forward direction of the vehicle 1 and side mirrors 14L and 14R configured to provide the driver with a view in a rearward direction of the vehicle 1.

The wheels includes front wheels provided at the front of the vehicle and rear wheels provided at the rear of the vehicle, and a driving device (not shown) provided in the vehicle 1 provide a rotational force to the front wheels or the rear wheels so that the vehicle 1 moves forward or rearward. The driving device may employ an engine that generates a rotational force by burning fossil fuel, or a motor that generates power by receiving power from a condenser.

The doors may be rotatably provided on left and right sides of the vehicle 1 so that the driver or a passenger can ride inside the vehicle 1 when the door is opened and the door may shield the inside of the vehicle 1 from the outside when the door is closed. Knobs may be provided on the exterior of the vehicle 1 to open or close the doors 15L and 15R and the knobs may be provided with a low frequency (LF) antenna (not shown) capable of transmitting an LF signal.

The front glass 16 is provided on a front upper side of a vehicle body so that a driver inside the vehicle 1 may acquire visual information in the forward direction of the vehicle 1 and the front glass 16 is also referred to as a windshield glass.

The side mirrors 14L and 14R include a left side mirror 14L provided on the left side of the vehicle 1 and a right side mirror 14R provided on the right side of the vehicle. The side mirrors 14L and 14R provide the driver with visual information for the lateral side and the rear side of the vehicle.

In addition, the vehicle 1 may include a proximity sensor configured to detect obstacles or other vehicles located in the rear side or the lateral side of the vehicle 1 and a sensor such as a rain sensor configured to anticipate or detect the rainfall.

The proximity sensor may transmit a detection signal from a lateral side or a rear side of the vehicle and receive a reflection signal reflected from an obstacle such as another vehicle. It is possible to detect the presence or absence of an obstacle on the lateral side or the rear side of the vehicle 1 based on the waveform of the received reflection signal and to detect the position of the obstacle. For example, the proximity sensor may transmit ultrasonic waves or infrared rays and detect a distance to an obstacle by using the ultrasound waves or infrared rays reflected from the obstacle.

The vehicle may include an image acquiring unit 100 including cameras 101-1, 101-2, 101-3, and 101-4. The cameras 101-1, 101-2, 101-3, and 101-4 that constitute the image acquiring unit 100 and acquire images around the vehicle may be provided on front, rear, and lateral sides of the vehicle to acquire the images, and the images acquired by the cameras 101-1, 101-2, 101-3, and 101-4 may be output as the images around the vehicle through a method described below.

Figure 2:
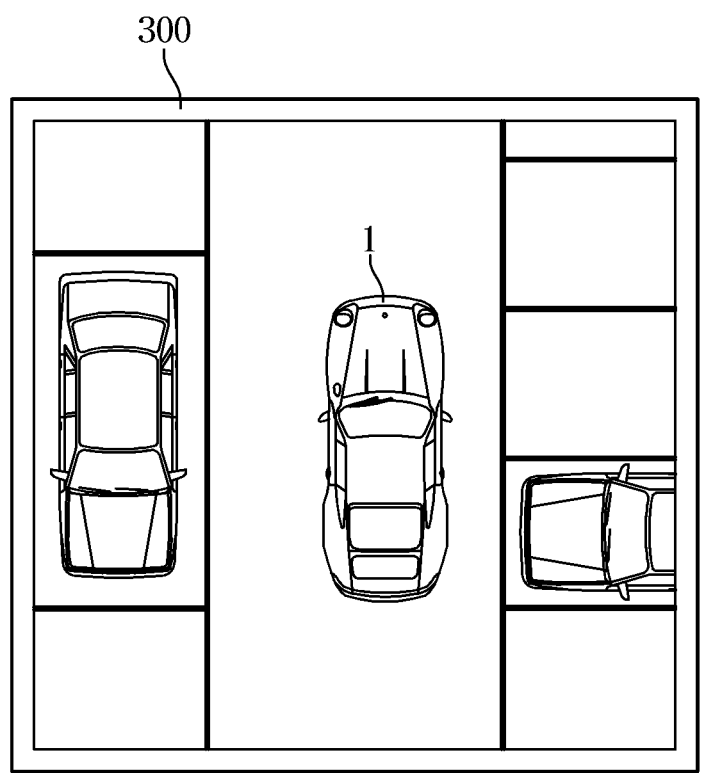
FIG. 2 is a top view of the vehicle.

FIG. 2 is a top view image output to a display 300 of the vehicle in one form.

A forward image, a rearward image, a leftward image, and a rightward image acquired from four image acquiring units, which are respectively installed on a front of the vehicle, a trunk of the vehicle, and left and right side mirrors, can be converted into the top view image of the vehicle which is taken from the top of the vehicle.

The vehicle may adopt an image registration processing technique to convert the different forward, rearward, rightward and leftward images into one top view image. The display quality of the top view image may be determined depending on the consistency of the image registration processing technique.

Figure 3:
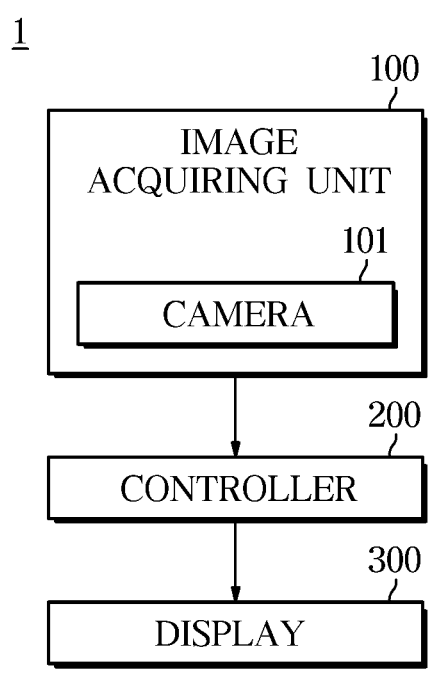
FIG. 3 is a control block diagram of the vehicle.

FIG. 3 is a control block diagram of the vehicle 1 according to one form of the present disclosure.

Referring to FIG. 3, the vehicle may include an image acquiring unit 100, a controller 200, and a display 300.

The image acquiring unit 100 may acquire images around the vehicle. The image acquiring unit 100 may include at least one camera provided in the vehicle.

The camera can photograph the forward, rightward, leftward, and rearward images of the vehicle and transmit the photographed images to the controller 200. According to one form, the camera 101 may be provided in the side mirrors 14R and 14L installed in the vehicle 1 to acquire images around the vehicle 1.

The camera 101 installed in the vehicle 1 may include charge-coupled device (CCD) camera 101 or a complementary metal-oxide semiconductor (CMOS) color image sensor. The CCD and CMOS refer to a sensor that converts light received through a lens of the camera 101 into an electric signal and stores the electric signal. Specifically, the CCD camera 101 is a device that converts an image into an electric signal by using a CCD. In addition, a CMOS image sensor (CIS) refers to a low-power consumption type image pickup device having a CMOS structure and serves as an electronic film of a digital device. In general, the CCD is more sensitive than the CIS, and thus the CCD is mainly used in the vehicle 1, but the present disclosure is not limited thereto.

The display 300 may be implemented as a display device provided on a center fascia of the vehicle.

The display 300 may include a cathode ray tube (CRT), a digital light processing (DLP) panel, a plasma display panel (PDP), a liquid crystal display (LCD) panel, an electroluminescence (EL) panel, an electrophoretic display (EPD) panel, an electrochromic display (ECD) panel, a light-emitting diode (LED) panel or an organic light-emitting diode (OLED) panel, but the present disclosure is not limited thereto.

The controller 200 may generate a top view image of the vehicle based on the difference between the image around the vehicle and a predetermined reference line R and output the top view image to the display 300.

The predetermined reference line R may be previously stored in the controller 200 as a reference for extracting a slope of a road around the vehicle.

Meanwhile, a plurality of predetermined reference lines R, which serve as a reference for the controller 200, may be provided.

Further, the controller 200 may extract a plurality of feature lines from the image around the vehicle and compare the feature lines with the predetermined reference lines R to form the top view image of the vehicle.

The controller 200 may change the image around the vehicle based on angles defined by the feature lines and the predetermined reference lines R.

Specifically, the controller 200 may change the image around the vehicle based on the difference between a first angle defined by the feature lines and a second angle defined by the predetermined reference lines R.

The controller 200 may decrease the viewing angle for the image around the vehicle based on the difference between the first angle and the second angle when the first angle defined by the feature lines is smaller than the second angle defined by the predetermined reference lines R.

The viewing angle for the image around the vehicle refers to an angle define by the camera and the vehicle, in which the camera serves as a subject to make a view for the image around the vehicle. When the viewing angle increases, the image for a larger area around the vehicle may be acquired, and when the viewing angle decreases, the image for a smaller area around the vehicle may be acquired. Meanwhile, the viewing angle disclosed in this specification may be interpreted as a viewing angle of a virtual camera in the image around the vehicle.

The controller 200 may increase the viewing angle for the image around the vehicle based on the difference between the first angle and the second angle when the first angle defined by the feature lines is larger than the second angle defined by the predetermined reference lines R.

Further, the controller 200 may compare the feature lines with the predetermined reference lines R to determine the slope of the road around the vehicle and the tilt of the vehicle prior to the image processing, and details thereof will be described below.

Meanwhile, the controller 200 may extract the plurality of feature lines based on at least one of a parking line, a driving lane, and a stereoscopic vertical structure included in the image around the vehicle.

The feature lines refer to lines that can be compared with previously stored reference lines R to determine the slope of the road in the image around the vehicle or to determine the tilt of the vehicle and may be extracted based on straight lines included in the image around the vehicle.

The controller 200 may include a memory (not shown) configured to store an algorithm to control the operation of components in the vehicle or data of a program configured to reproduce the algorithm and a processor (not shown) that executes the above operation by using the data stored in the memory. In this case, the memory and the processor may be implemented as separate chips. Alternatively, the memory and the processor may be implemented as a single chip.

At least one component may be added or deleted corresponding to the performance of the components of the vehicle shown in FIG. 3. It will be readily understood by those skilled in the art that the relative position of the components can be changed corresponding to the performance or structure of the system.

Meanwhile, the components shown in FIG. 3 refer to software components and/or hardware components such as a field programmable gate array (FPGA) and an application specific integrated circuit (ASIC).

Figure 4A:
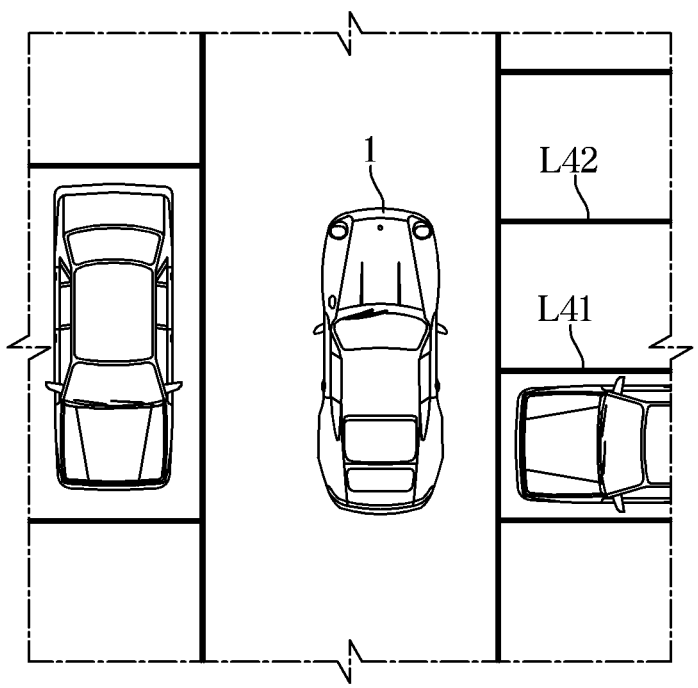
FIGS. 4A and 4B are views for describing an operation for extracting feature lines.
Figure 4B:
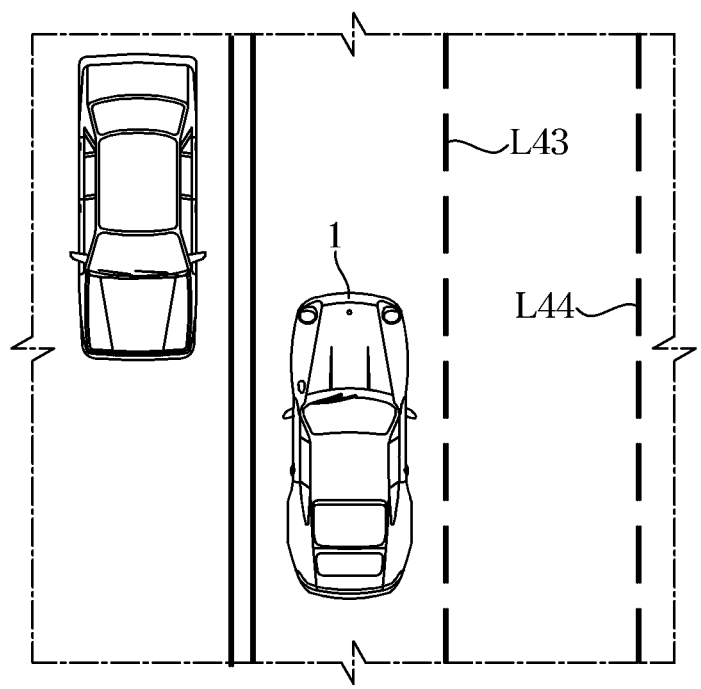

FIGS. 4A and 4B are views for describing an operation for extracting feature lines in one form of the present disclosure.

Referring to FIGS. 4A and 4B, the image around the vehicle 1 may include straight line elements such as parking lines L41 and L42 and road lines L43 and L44. For example, since the parking lines L41 and L42 are provided on the road in consideration of road surface characteristics, the controller may extract the straight line components of the parking lines from the image acquired by the image acquiring unit as the feature lines.

According to another form, since the road lines L43 and L44 are presented as straight lines in the traveling direction of the vehicle, angular deformation may occur in front and rear regions due to acceleration or tilt of the vehicle or air pressure difference. Thus, the controller may extract the straight lines of the road lines as the feature lines to compare the straight lines with the previously stored reference lines R described above.

According to another form, the feature lines may be acquired from a stereoscopic vertical structure included in the image around the vehicle. The stereoscopic vertical structure may include a building or a fixture on the ground included in the image around the vehicle and the type of the stereoscopic vertical structure may not be limited as long as the slope of the road and the tilt of the vehicle can be determined from the stereoscopic vertical structure.

Figure 5A:
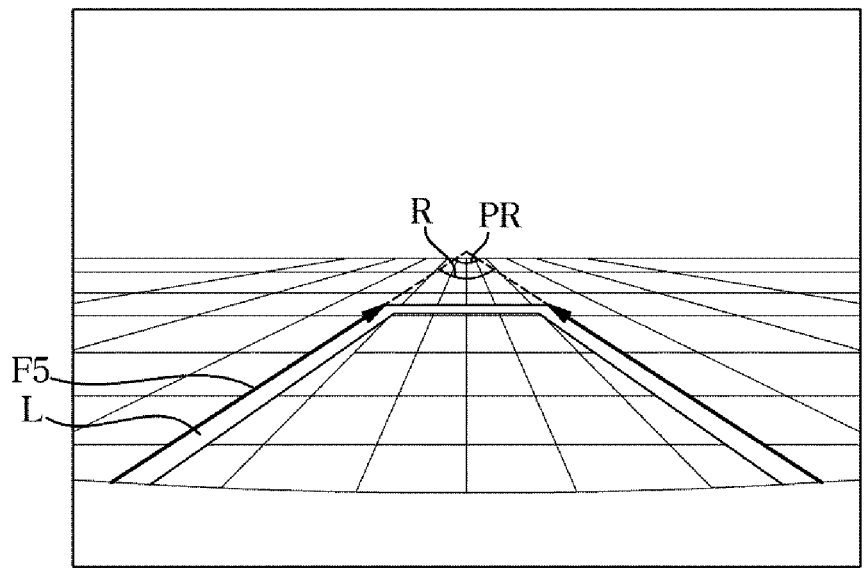
FIGS. 5A and 5B are views for describing an angle match between an angle of feature lines and an angle of reference lines.
Figure 5B:
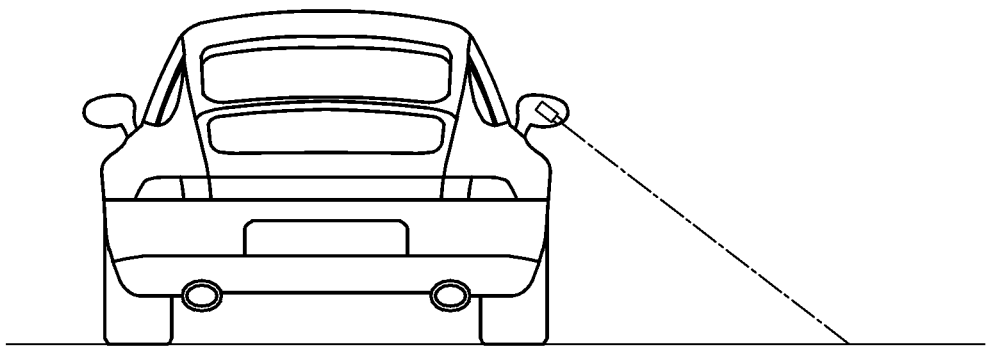

FIGS. 5A and 5B are views for describing an angle match between the angle of the feature line and the angle of the reference line R according to one form of the present disclosure.

Referring to FIGS. 5A and 5B, the reference line R previously stored in the controller is compared with the feature line extracted from the image around the vehicle.

The reference lines R may be previously stored in the controller at the stage of manufacturing the vehicle. The reference line R may serve as a reference for determining the degree of slope of the road in the acquired image around the vehicle. The controller may compare the feature line in the image around the vehicle extracted as described above with the previously stored reference line R to determine the slope of the road on which the vehicle is located.

Meanwhile, the reference line R and a feature line F5 may include length and angle components. The length may be preset to compare the reference line R and the feature line F5. Angles PR and PF may be defined by two straight lines. Meanwhile, when the angle PR defined by the reference line R is the same as an angle PF5 acquired from the image around the vehicle, the controller may determine that the angle is zero which indicates that there is no slope around the vehicle. In addition, although FIG. 5A shows the reference line R and the feature line F5 to be substantially coincident with each, the controller may determine that the road where the vehicle is located is a flat road when the angles defined by the feature line and the reference line R are substantially coincident with each other even when the feature line and the reference line R are not coincident with each.

That is, even when the controller determines that the reference line and the feature line are not substantially coincident with each other because the position of the reference line R is different from the position of the feature line F5, the controller may determine that the road is flat or the vehicle is not tilted to one side when the angle defined by the reference line R is substantially the same as an angle defined by the feature line F5.

Figure 6A:
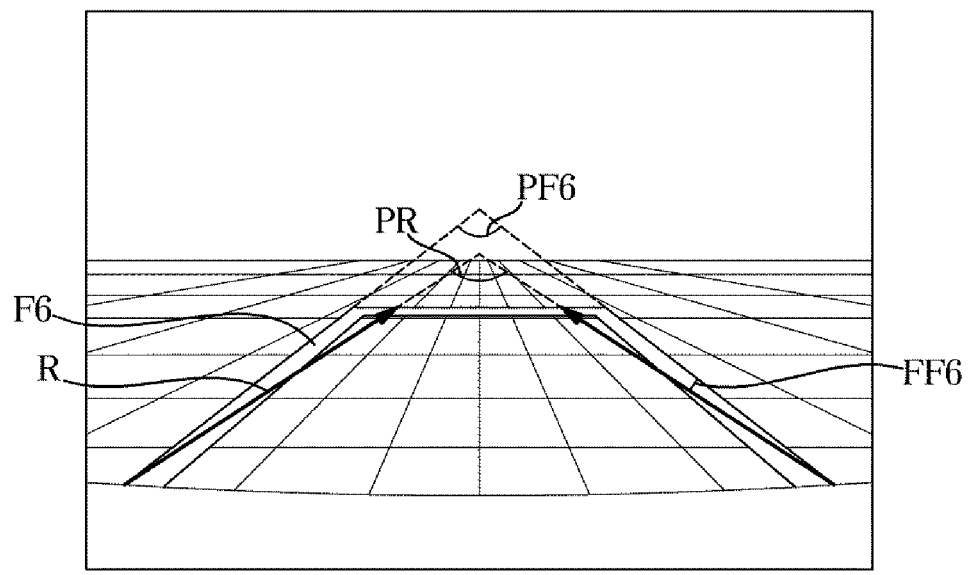
FIGS. 6A and 6B are views for describing a case in which the vehicle according to one form is located on a road of a downhill slope.
Figure 6B:
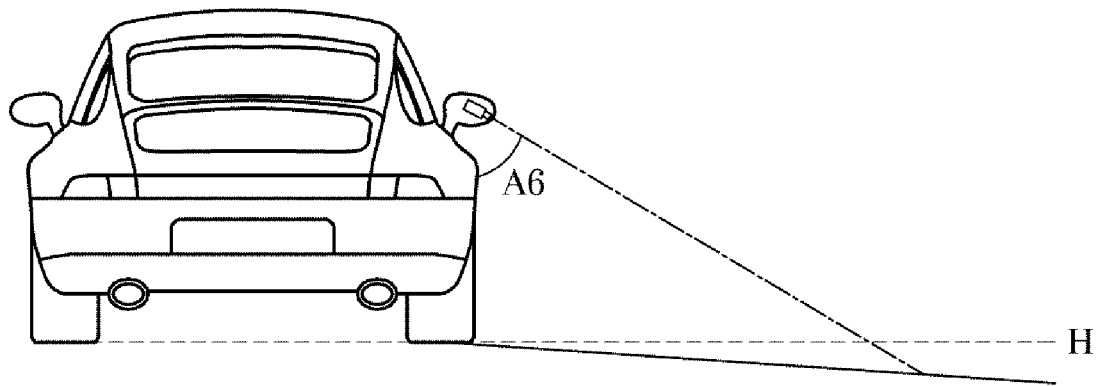
Figure 7A:
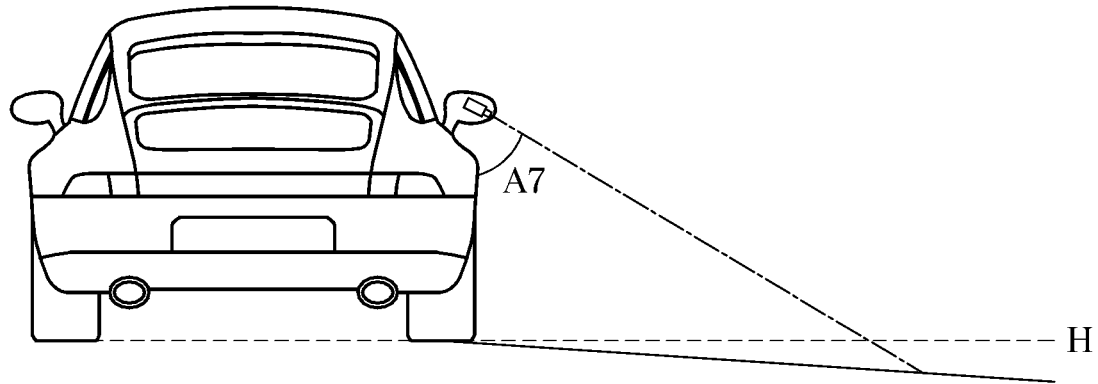
FIGS. 7A and 7B are views for describing a change of an image around a vehicle when the vehicle is located on a road of a downhill slope.
Figure 7B:
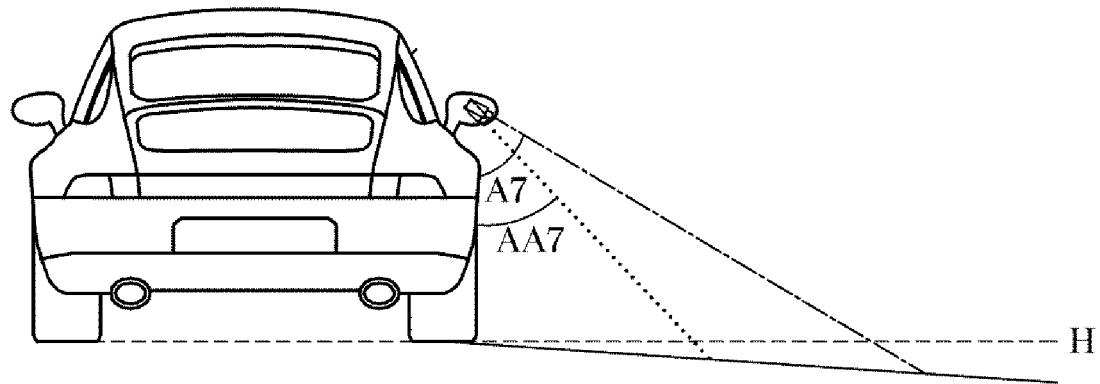

In another form of the present disclosure, FIGS. 6A and 6B are views for describing a case in which the vehicle is located on a road of a downhill slope, and FIGS. 7A and 7B are views for describing a change of an image around a vehicle when the vehicle is located on a road of a downhill slope.

Referring to FIGS. 6A and 6B, the feature line F6 of the road is located outside the reference line R of the vehicle. The feature line F6 of the image around the vehicle may be provided as shown in FIG. 6A when the road is downhill.

In this case, an angle PF6 defined by the feature line F6 of the image around the vehicle may be smaller than an angle defined by the reference line R. The controller may compare the angle PF6 defined by the feature line F6 with the angle PR formed by the reference line R. The controller may determine that the slope of the road on which the vehicle is located is a downhill slope when the angle defined by the feature line F6 is smaller than the angle PR defined by the reference line R. Further, the controller may change the image around the vehicle based on the angles defined by the feature line and the predetermined reference line R.

FIGS. 7A and 7B illustrate the situation of FIGS. 6A and 6B through a viewing angle A7 of the vehicle. That is, when a slope of a side road of the vehicle is a downhill slope, the controller may decrease a viewing angle AA7 to form the top view image. The operation of changing the viewing angle may be performed based on the angles defined by the feature line and the predetermined reference line R.

Meanwhile, the viewing angle AA7 shown in FIG. 7B may be interpreted as a viewing angle of a virtual camera in the image around the vehicle, which is acquired by the vehicle. The controller may form a top view based on the image, in which the viewing angle AA7 is decreased, to secure the conversion accuracy between actual coordinates and image coordinates, thereby improving the accuracy of image recognition and the like.

Figure 8A:
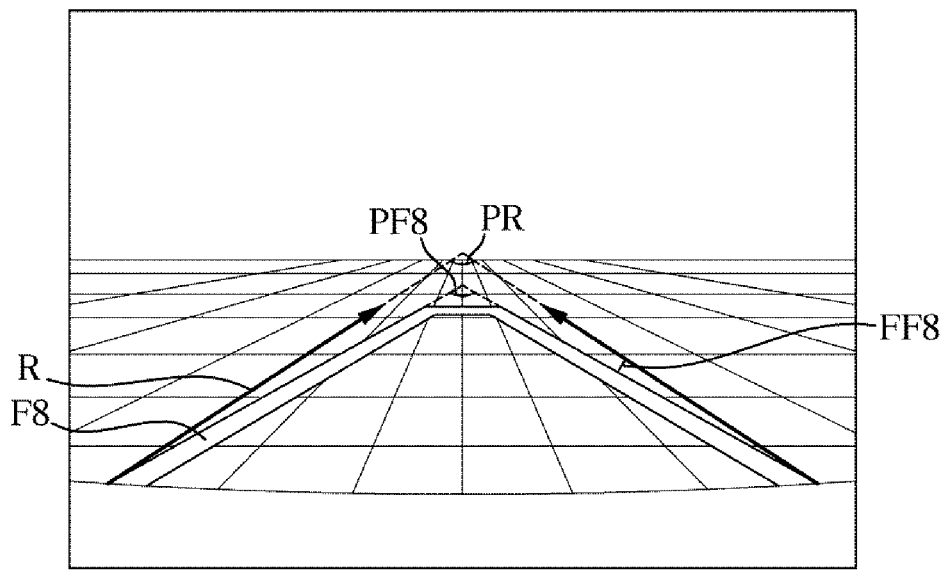
FIGS. 8A and 8B are views for describing a case in which the vehicle is located on a road of an uphill slope.
Figure 8B:
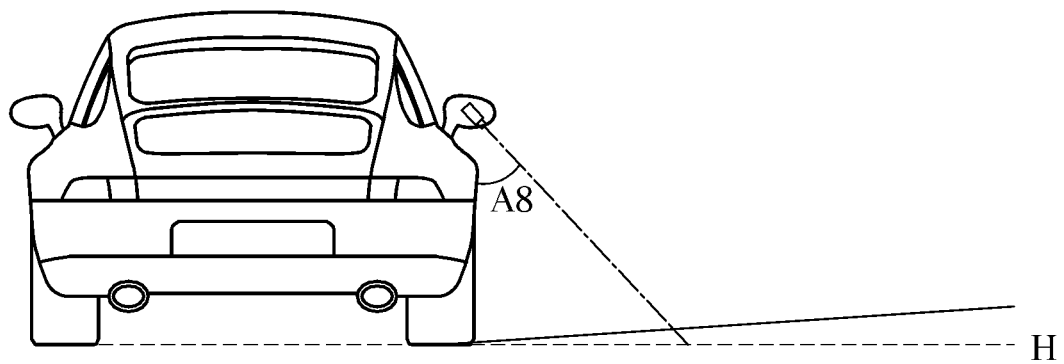
Figure 9A:
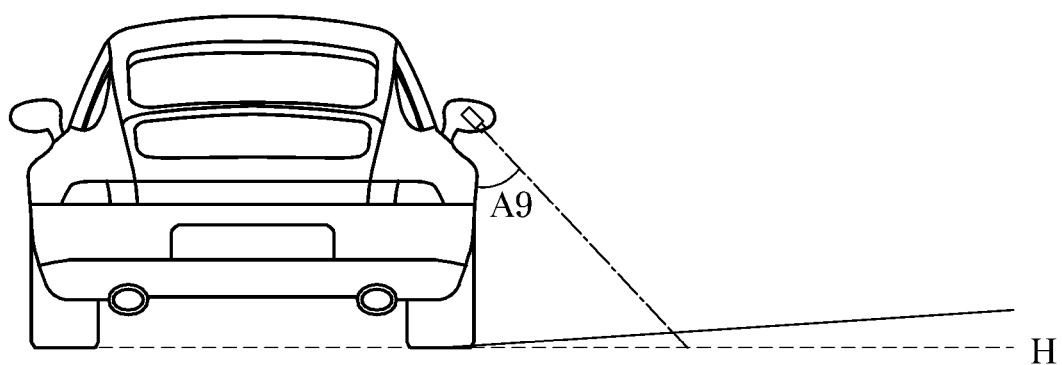
FIGS. 9A and 9B are views for describing a change of an image around a vehicle when the vehicle is located on a road of an uphill slope.
Figure 9B:
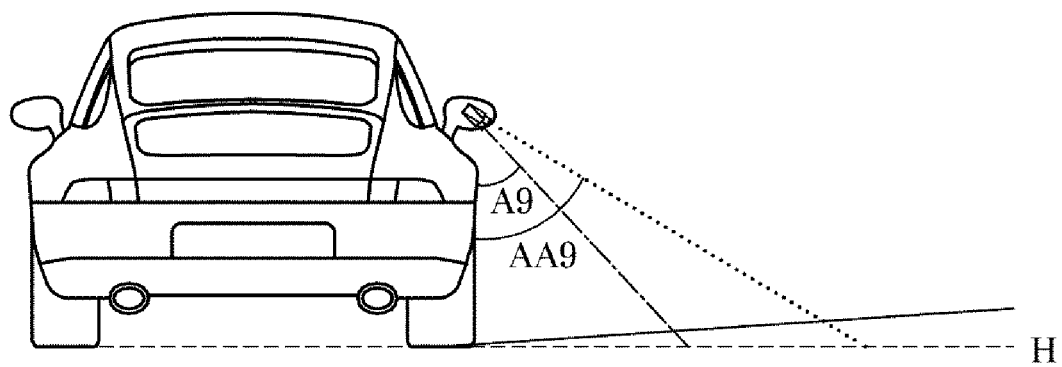

In one form of the present disclosure, FIGS. 8A and 8B are views for describing a case in which the vehicle is located on a road of an uphill slope, and FIGS. 9A and 9B are views for describing a change of an image around a vehicle when the vehicle is located on a road of an uphill slope.

Referring to FIG. 8A, the feature line F8 of the road is located inside the reference line R of the vehicle. The feature line of the image around the vehicle may be provided as shown in FIG. 8A when the road is uphill.

In this case, an angle F8 defined by the feature line of the image around the vehicle may be larger than the angle defined by the reference line R. The controller may compare the angle F8 defined by the feature line with the angle defined by the reference line R. The controller may determine that the slope of the road on which the vehicle is located is an uphill slope when the angle F8 defined by the feature line is larger than the angle PR defined by the reference line R. The controller may change the image around the vehicle based on an angle FF8 defined by the feature line and the predetermined reference line R.

FIGS. 9A and 9B illustrate the situation of FIGS. 8A and 8B through a viewing angle A9 of the vehicle. That is, when the slope of the side road of the vehicle is an uphill slope, the controller may increase a viewing angle AA9 of the image around the vehicle to form a top view. The controller may change the viewing angle based on the angle FF8 defined by the feature line and the predetermined reference line R.

Meanwhile, the viewing angle shown in FIGS. 8A and 8B may be interpreted as the viewing angle A9 of the virtual camera in the image around the vehicle, which is acquired by the vehicle. The controller may form a top view based on the image, in which the viewing angle AA9 is decreased, to secure the conversion accuracy between actual coordinates and image coordinates, thereby improving the accuracy of image recognition and the like.

Figure 10A:
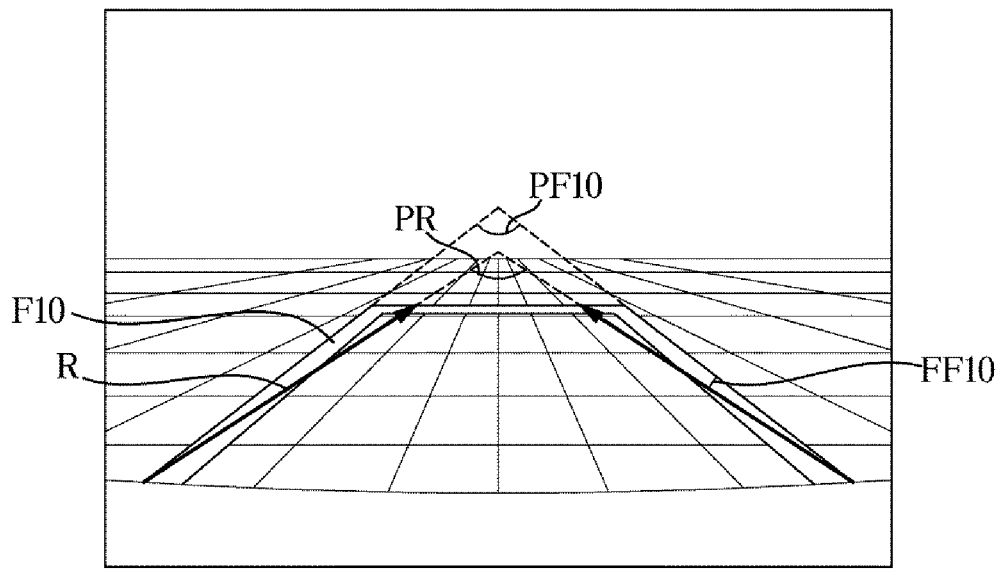
FIGS. 10A and 10B are views for describing a case in which a left side of the vehicle is tilted downward.
Figure 10B:
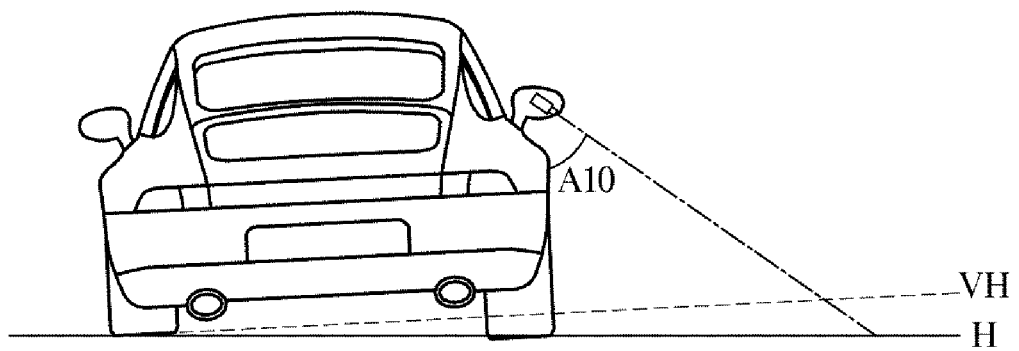
Figure 11A:
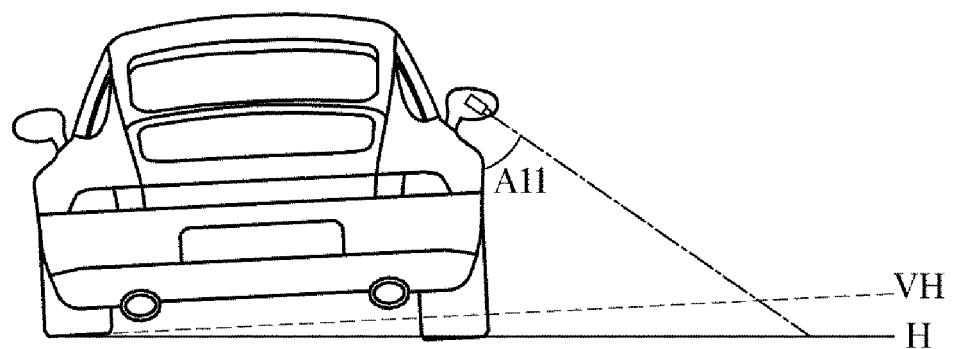
FIGS. 11A and 11B are views for describing a change of an image around the vehicle in a case of FIGS. 10A and 10B.
Figure 11B:
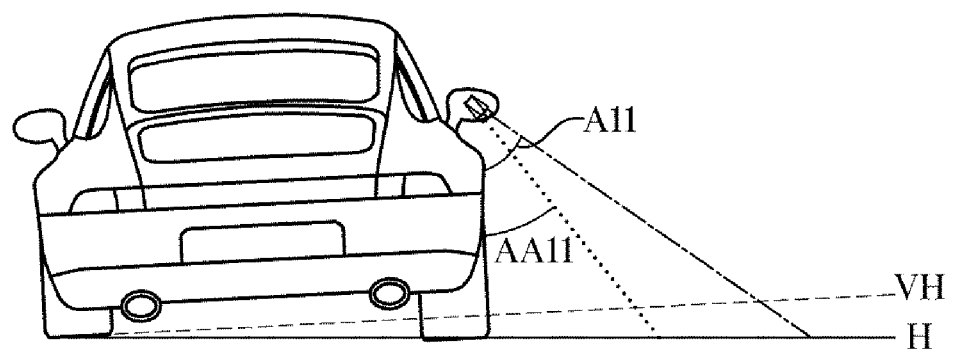

In other form of the present disclosure, FIGS. 10A and 10B are views for describing a case in which a left side of the vehicle is tilted downward, and FIGS. 11A and 11B are views for describing a change of an image around the vehicle in a case of FIGS. 10A and 10B.

Referring to FIGS. 10A and 10B, a left side of the vehicle is lowered and a right side of the vehicle is raised when viewed from a rear of the vehicle.

This case is similar to the situation of FIGS. 6A and 6B in which a road of a downhill slope is located at a lateral side of the vehicle. That is, the case shown in FIGS. 10A and 10B may have the same relationship of the reference line R and the feature line F10 as FIG. 6A. When the vehicle is tilted to the left, the feature line F10 of the image around the vehicle may be located outside the reference line R. The feature line F10 located outside the reference line R may define the angle PF10 smaller than the angle PR defined by the reference line R. In this case, it is also possible to correct the image around the vehicle to improve the accuracy of the top view image formed by the controller. Further, the controller may correct the image around the vehicle based on an angle FF10 defined by the feature line and the reference line.

Referring to FIGS. 11A and 11B in one form of the present disclosure, since the top view image formed by the controller may be distorted when the vehicle is tilted to the left, the top view image may be formed by decreasing a viewing angle A11 of the image around the vehicle. The correction of the image around the vehicle when the vehicle is tilted to the left may correspond to the operation when the slope of the road around the vehicle is the downhill slope.

Figure 12A:
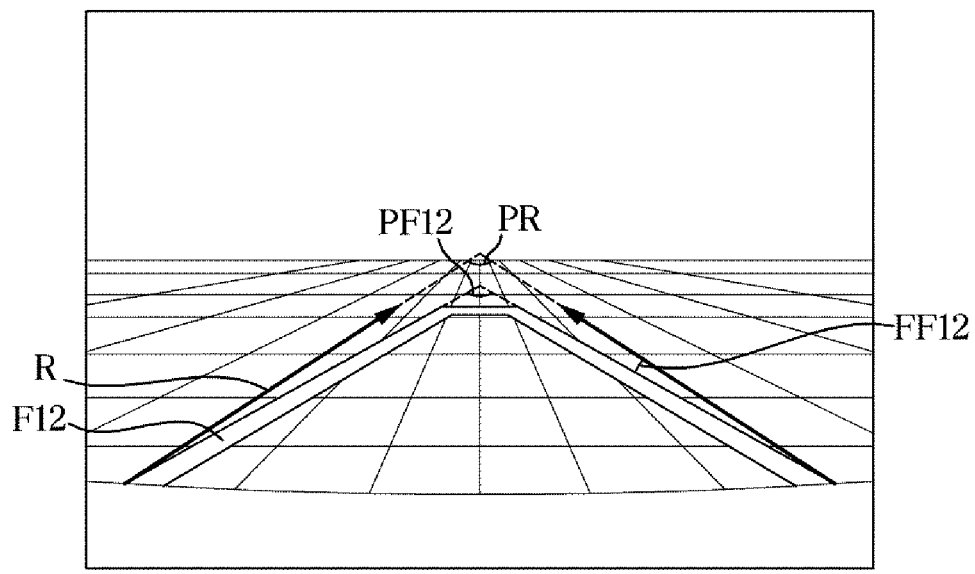
FIGS. 12A and 12B are views for describing a case in which a right side of the vehicle is tilted downward.
Figure 12B:
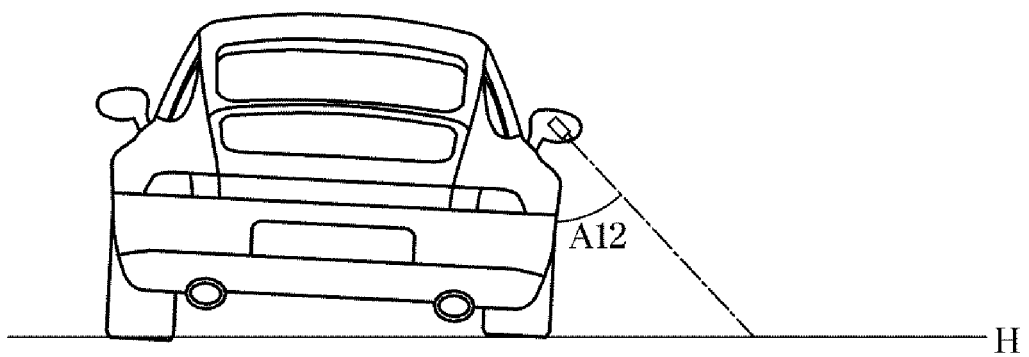
Figure 13A:
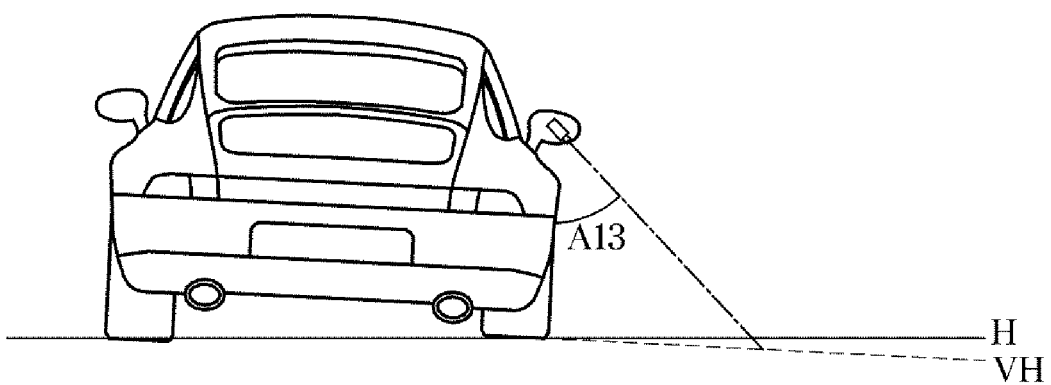
FIGS. 13A and 13B are views for describing a change of an image around the vehicle in a case of FIGS. 12A and 12B.
Figure 13B:
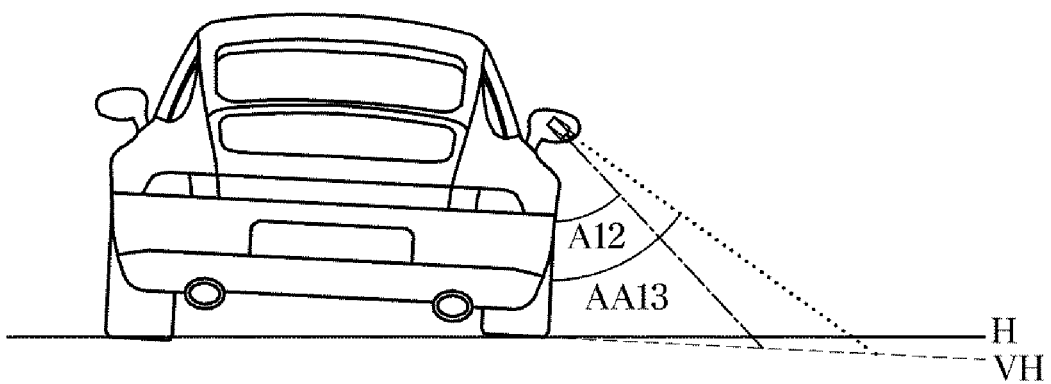

In another exemplary form of the present disclosure, FIGS. 12A and 12B are views for describing a case in which a right side of the vehicle is tilted downward, and FIGS. 13A and 13B are views for describing a change of an image around the vehicle in a case of FIGS. 12A and 12B.

Referring to FIGS. 12A and 12B, a right side of the vehicle is lowered and a left side of the vehicle is raised when viewed from a rear of the vehicle.

This case is similar to the situation of FIGS. 8A and 8B in which a road of an uphill slope is located at a lateral side of the vehicle. That is, the case shown in FIGS. 12A and 12B may have the same relationship of the reference line R and a feature line F12 as FIG. 8A. When the vehicle is tilted to the right, the feature line F12 of the image around the vehicle may be located inside the reference line R. The feature line F12 located inside the reference line R may define the angle PF12 larger than the angle defined by the reference line R. In this case, it is also possible to correct the image around the vehicle to improve the accuracy of the top view image formed by the controller. Further, the controller may correct the image around the vehicle based on the angle FF12 defined by the feature line and the reference line.

Referring to FIGS. 13A and 13B, since the top view image formed by the controller may be distorted when the vehicle is tilted to the right, the top view image may be formed by increasing a viewing angle AA13 of the image around the vehicle. The correction of the image around the vehicle when the vehicle is tilted to the right may correspond to the operation when the slope of the road around the vehicle is the uphill slope.

Figure 14:
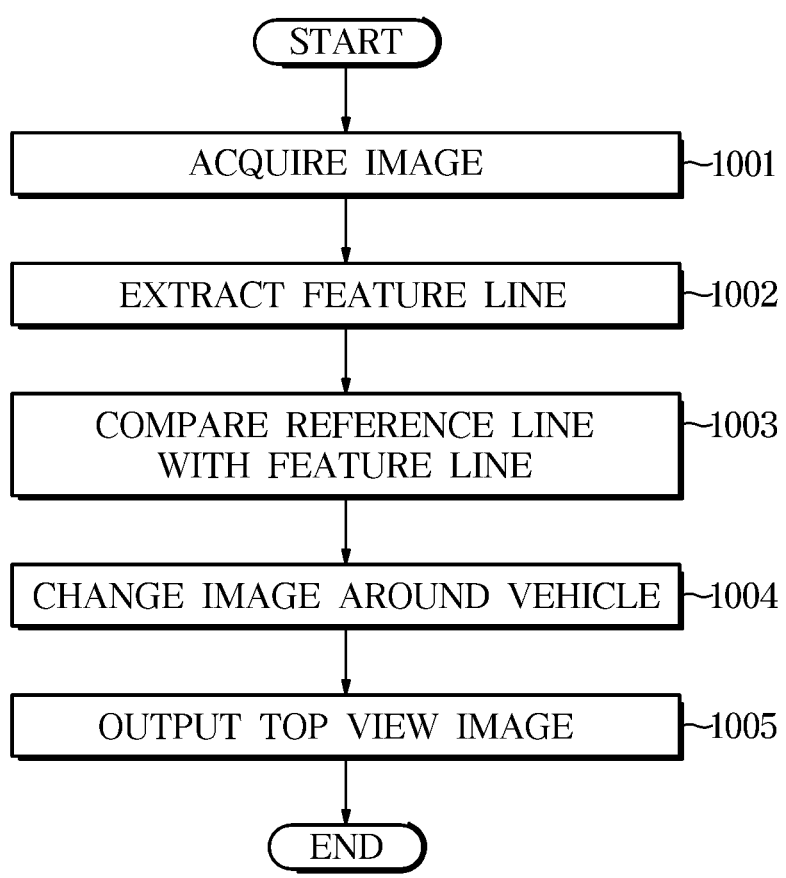
FIG. 14 is a flowchart illustrating a method.

FIG. 14 is a flowchart according to one form of the present disclosure.

Referring to FIG. 14, an image around a vehicle is acquired (1001), and a feature line is extracted based on the image around the vehicle (1002). A controller compares a reference line R with a feature line (1003), and changes the image around the vehicle to form a top view image with less distortion (1004). The controller may output the top view image to a display of the vehicle based on the changed image around the vehicle (1005).

Meanwhile, the disclosed forms may be implemented as a recording medium for storing instructions executable by a computer. The instructions may be stored as a program code and may generate a program module when executed by a processor to perform the operations of the disclosed forms. The recording medium may be implemented as a computer-readable recording medium.

The computer-readable recording medium may include any kind of recording media where instructions which can be decoded by a computer are stored. For example, the recording media may include a read only memory (ROM), a random access memory (RAM), a magnetic tape, a magnetic disk, a flash memory, an optical data storage device, and the like.

As is apparent from the above description, a vehicle and a control method thereof in one form of the present disclosure can determine a state of the vehicle or a slope of a road surface using an image acquired by the vehicle, and provide a top view image with less distortion by correcting the image based on the state of the vehicle and the slope of the road surface.

It will be understood by those skilled in the art that various changes in form and details may be made without departing from the spirit and scope of the present disclosure. The disclosed forms are illustrative purposes only and should not limit the present disclosure.

What is claimed is:

1. A vehicle comprising:
   a display;
   a camera configured to acquire an image around the vehicle; and
   a controller configured to change the image around the vehicle based on a difference between the image around the vehicle and at least one predetermined reference line and configured to output the changed image to the display,
   wherein the at least one predetermined reference line comprises a plurality of predetermined reference lines, and the controller is configured to extract a plurality of feature lines representing characteristics of a road on which the vehicle is present from the image around the vehicle and change the image around the vehicle by comparing the plurality of feature lines with the plurality of predetermined reference lines, and wherein the controller is further configured to:
- change the image around the vehicle based on angles defined by the plurality feature lines and the plurality of predetermined reference lines,
- change the image around the vehicle based on a difference between a first angle defined by the plurality of feature lines and a second angle defined by the plurality of predetermined reference lines,
- decrease a viewing angle for the image around the vehicle when the first angle is less than the second angle, and
- increase a viewing angle for the image around the vehicle when the first angle is equal to or greater than the second angle.

2. The vehicle according to claim 1, wherein the controller is configured to compare a feature line of the plurality of feature lines with a predetermined reference line of the plurality of predetermined reference lines and to determine a road slope around the vehicle.

3. The vehicle according to claim 1, wherein the controller is configured to compare a feature line of the plurality of feature lines with a predetermined line of the plurality of predetermined reference lines and to determine a tilt of the vehicle.

4. The vehicle according to claim 1, wherein the controller is configured to extract the plurality of feature lines based on at least one of a parking line, a driving lane, or a stereoscopic vertical structure included in the image around the vehicle.

5. A method of controlling a vehicle, the method comprising:
- acquiring an image around a vehicle;
- changing the image around the vehicle based on a difference between the image around the vehicle and at least one predetermined reference line; and
- outputting the changed image on a display, wherein the at least one predetermined reference line comprises a plurality of predetermined reference lines, and wherein changing the image around the vehicle comprises:
- extracting a plurality of feature lines representing characteristics of a road on which the vehicle is present from the image around the vehicle,
- changing the image around the vehicle by comparing a feature line of the plurality of feature lines with a predetermined reference line of the plurality of predetermined reference lines,
- changing the image around the vehicle based on angles defined by the plurality of feature lines and the plurality of predetermined reference lines,
- changing the image around the vehicle based on a difference between a first angle defined by feature lines of the plurality of feature lines and a second angle defined by predetermined reference lines of the plurality of predetermined reference lines,
- reducing a viewing angle for the image around the vehicle when the first angle is less than the second angle, and
- increasing a viewing angle for the image around the vehicle when the first angle is equal to or larger than the second angle.

6. The method according to claim 5, further comprising: comparing a feature line of the plurality of feature lines with a predetermined reference line of the plurality of predetermined reference lines to determine a road slope around the vehicle.

7. The method according to claim 5, further comprising: comparing a feature line of the plurality of feature lines with a predetermined reference line of the plurality of predetermined reference lines to determine a tilt of the vehicle.

8. The method according to claim 5, further comprising: extracting the plurality of feature lines based on at least one of a parking line, a driving lane, or a stereoscopic vertical structure included in the image around the vehicle.

* * * * *